United States Patent [19]
Wheeler

[11] 3,994,090

[45] Nov. 30, 1976

[54] MARKING AND SPLICING AID FOR CABLES

[76] Inventor: James W. Wheeler, 20 Pollasky, Clovis, Calif. 93612

[22] Filed: Aug. 18, 1975

[21] Appl. No.: 605,652

[52] U.S. Cl. .............................. 40/316; 174/112; 29/203 MW
[51] Int. Cl.² .......................................... G09F 3/00
[58] Field of Search ................ 40/316, 21 R, 23 R; 174/112; 29/203 J, 628

[56] References Cited
UNITED STATES PATENTS

| | | |
|---|---|---|
| 3,020,335 | 2/1962 | Gillis ................................. 174/112 |
| 3,197,554 | 7/1965 | Baker ................................. 174/112 |
| 3,459,878 | 8/1969 | Gressitt et al. ...................... 174/112 |

*Primary Examiner*—Louis G. Mancene
*Assistant Examiner*—John H. Wolff
*Attorney, Agent, or Firm*—Huebner & Worrel

[57] ABSTRACT

A marking and splicing aid for cables utilized in the splicing of telephone cables and the like where particular wires of cables to be spliced must be joined. The aid employs a multiplicity of color-coded wires each having opposite ends and a binder interconnecting the wires intermediate their opposite ends in predetermined ordered arrangement, said binder bearing color and numerical indicia corresponding to the color coding and ordered arrangement of the wires.

6 Claims, 8 Drawing Figures

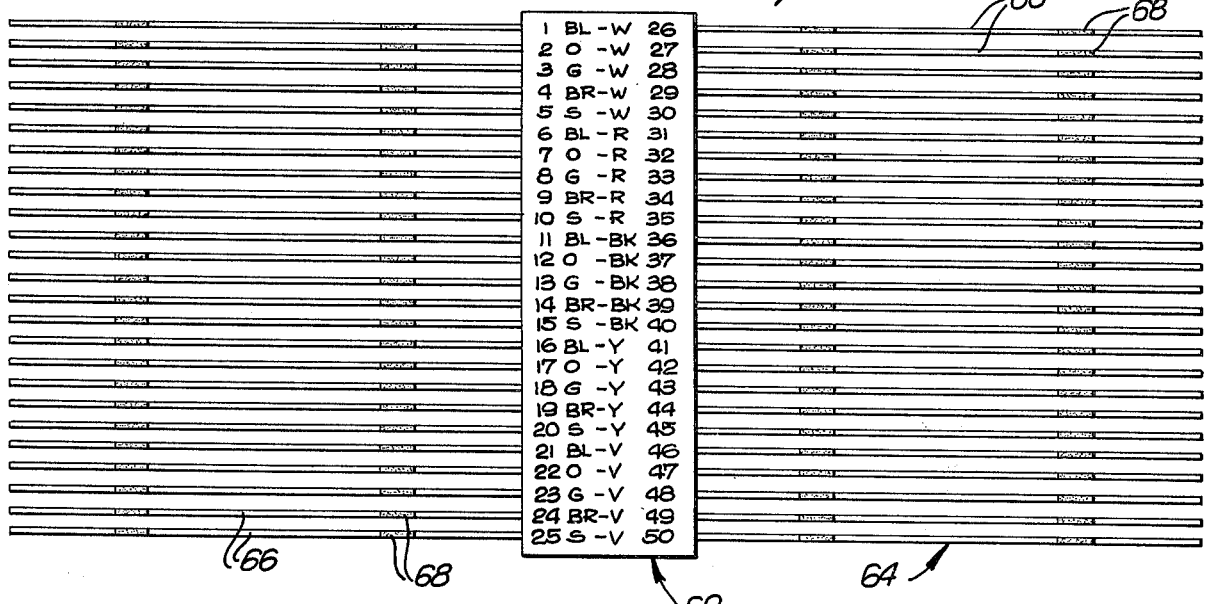
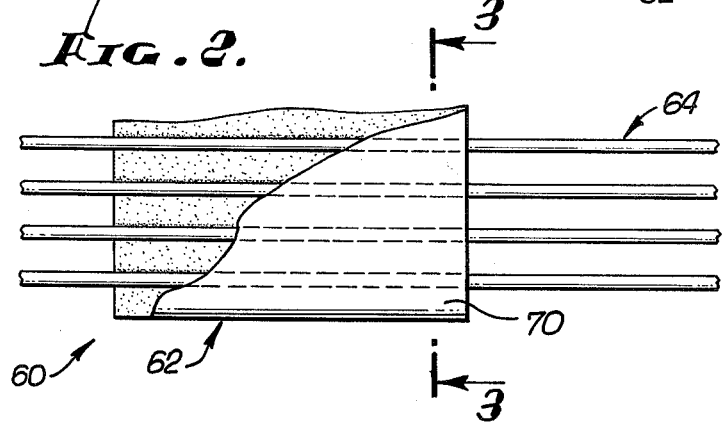
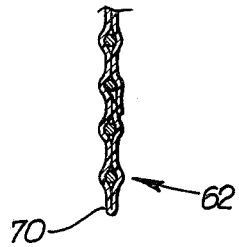
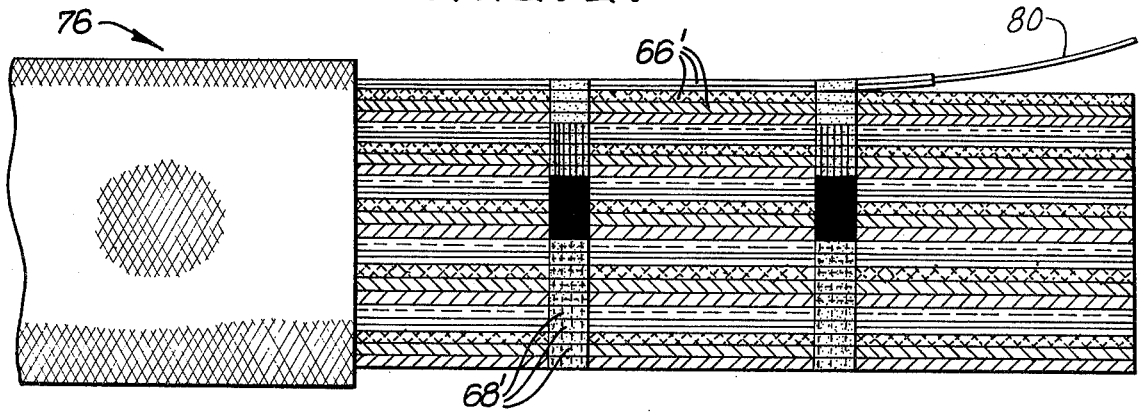

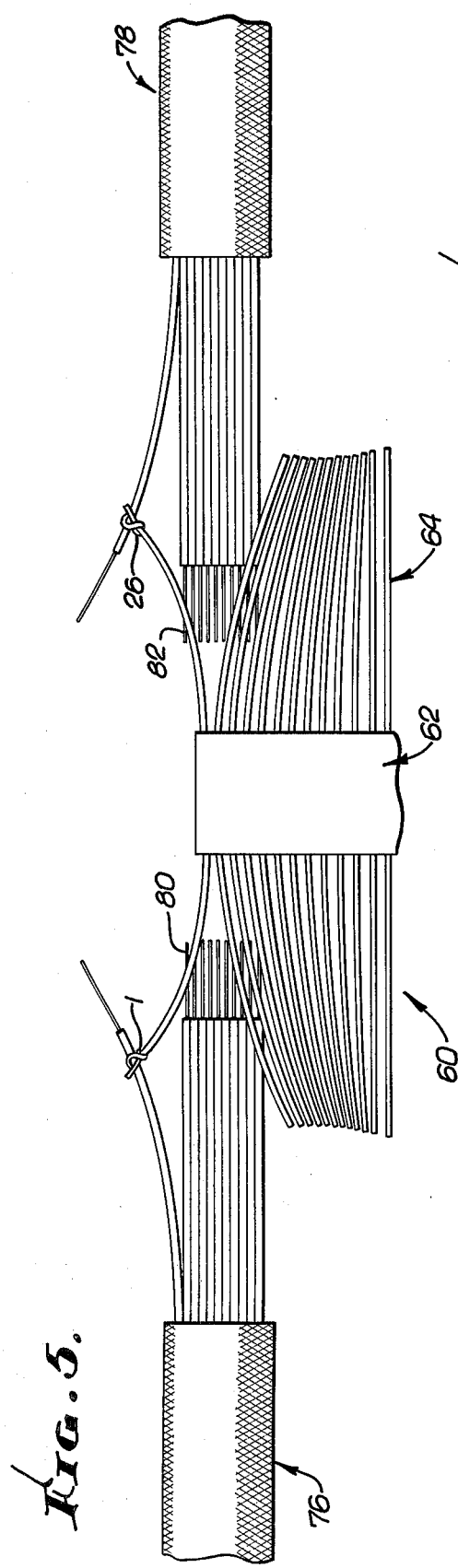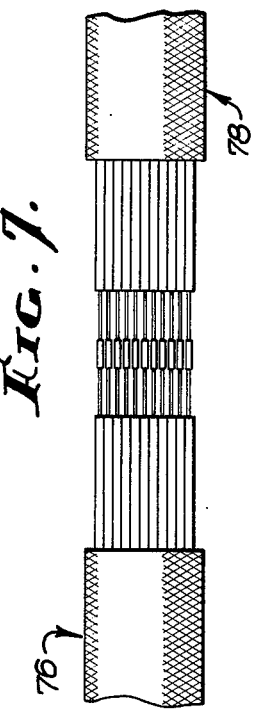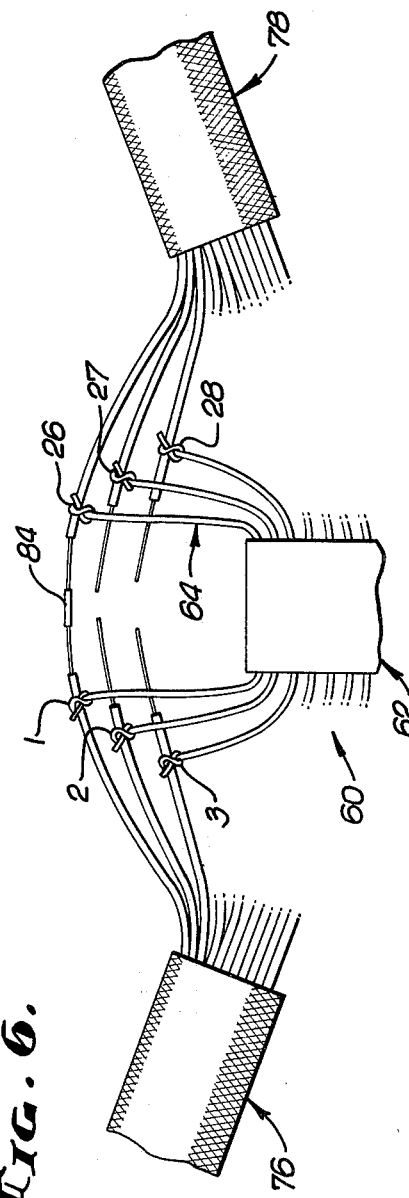

| | | | |
|---|---|---|---|
| 1 | BL | W | 26 |
| 2 | O | W | 27 |
| 3 | G | W | 28 |
| 4 | BR | W | 29 |
| 5 | S | W | 30 |
| 6 | BL | R | 31 |
| 7 | O | R | 32 |
| 8 | G | R | 33 |
| 9 | BR | R | 34 |
| 10 | S | R | 35 |
| 11 | BL | BK | 36 |
| 12 | O | BK | 37 |
| 13 | G | BK | 38 |
| 14 | BR | BK | 39 |
| 15 | S | BK | 40 |
| 16 | BL | Y | 41 |
| 17 | O | Y | 42 |
| 18 | G | Y | 43 |
| 19 | BR | Y | 44 |
| 20 | S | Y | 45 |
| 21 | BL | V | 46 |
| 22 | O | V | 47 |
| 23 | G | V | 48 |
| 24 | BR | V | 49 |
| 25 | S | V | 50 |

Fig. 8

MARKING AND SPLICING AID FOR CABLES

BACKGROUND OF THE INVENTION

The splicing of wires in telephone cables is an exceedingly meticulous undertaking which must be precisely accomplished. The cables come in various sizes, from those containing twenty-five wires up to those containing 2,500 wires or more. The wires are color-coded so that they can be segregated for connection purposes. No matter how large the cable, the wires are in sets or groups of twenty-five wires. Each group has a white family of wires, a red family, a black family, a yellow family, and a violet family. Within each family there is a blue wire, an orange wire, a green wire, a brown wire, and a slate wire. In the white family, each of the five colored wires has white markings. Similarly, in the red, black, yellow, and violet families, each of the five colored wires has red, black, yellow and violet markings, respectively.

There are two conventional procedures for segregating the wires of two cables to be spliced. In one instance, the operator uses an elongated rectangular piece of ribbon which he hangs near the splice, the ribbon having corresponding holes along opposite side edges thereof. In use, a blue wire, having white code markings, from one cable is extended through a hole on one edge of the paper, bent back upon itself and loosely twisted to maintain its position. A blue-white wire is then selected from the other cable and run through the corresponding hole on the opposite side edge of the ribbon and correspondingly bent back upon itself and twisted. The procedure continues until all of the wires from the two cables have been matched with the wires of the same color code being aligned transversely of the paper. A pair at a time, the wires are then disconnected from the ribbon and spliced.

The other conventional procedure is to prepare short lengths of the color-coded wires to be used as marking wires. A blue-white wire is selected from each of two cables to be spliced and a prepared marking blue-white wire is twisted about each of the cable wires at positions spaced back from the ends to hold them in paired relation with free tag ends to be spliced. The procedure is continued until all the color-coded wires have been paired by matching marking wires, frequently resulting in a virtually unmanageable entanglement. The tag ends of the cable wires are then interconnected in their segregated pairs and the marking wires removed.

These conventional procedures are tedious and slow, and that of using individual marking wires is particularly time-consuming in requiring the serviceman's time to make up the matching wires out of scrap cable and to keep them sufficiently well organized to be available when needed.

The present invention is a device made of an elongated strip of tape folded upon itself and having a multiplicity of marking wires sandwiched between the tape in substantially parallel spaced relation. The marking wires are segments of the color-coded wires, pre-cut from cables having the same colored coding. The tape is marked at the respective wires to correspond to color-coding and to relate to the cables being spliced and numbered in the sequence normally encountered in cables. In place of tape, cloth, paper, plastic or any other suitable flexible material may be utilized.

SUMMARY OF THE INVENTION

Devices made according to the invention provide servicemen with a tool with which they can connect correspondingly coded wires from two cables in a convenient and rapid manner. After all the connections have been made, the wires are then ready for splicing.

Accordingly, it is an object of the present invention to provide an improved aid for connecting cables to be spliced.

It is another object of the invention to provide such an aid that saves servicemen a very substantial amount of time in the segregation and connection of cables to be spliced.

It is still another object of the invention to provide an aid of the character described that is inexpensive to manufacture and convenient to store and carry Further objects of the invention are to provide improved elements and arrangements thereof in an aid which is convenient and accurate to use, economical, and fully effective in achieving its intended purposes.

BRIEF DESCRIPTION OF THE DRAWINGS

Referring to the accompanying drawings, which are for illustrative purposes:

FIG. 1 is a plan view of an aid embodying the principles of the present invention.

FIG. 2 is a somewhat enlarged fragmentary view of a lower end of the aid shown in FIG. 1.

FIG. 3 is a section taken on line 3—3 in FIG. 2.

FIG. 4 is a view of an end of a cable to be spliced.

FIG. 5 is a view of two cables in the process of having their ends connected to the aid of the present invention for splicing.

FIG. 6 is a fragmentary view of the two cables having had their ends connected to the aid of the present invention and involved in the splicing process.

FIG. 7 is a view of the two cables, shown in FIGS. 5 and 6, spliced and with the aid of the present invention removed.

FIG. 8 is a central portion of FIG. 1 enlarged to accommodate color coding symbols used thereon.

DESCRIPTION OF THE PREFERRED EMBODIMENT

Referring in greater particularity to the drawings, the aid of the present invention is shown in FIGS. 1 through 3 at 60 having a binder or holder 62 and twenty-five splicing and marking wires 64. Each marking wire has a predetermined colored insulation covering 66 and is marked at spaced intervals with a distinctive designating color, as at 68. The predetermined coloring of the marking wires is in accordance with the telephone cable wires discussed above and the marking wires are conveniently cut from or made in the same manner as the cables to be spliced. However, the term "marking wire" should be construed as encompassing not only wires per se, but strings, cords, and other color-coded flexible interconnecting means suitable for the purpose.

The binder 62 is a strip of pressure sensitive adhesive tape 70 folded back upon itself, the wires 64 being sandwiched and secured between the tape and spaced in a substantially parallel relation. The binder 62 may be stitched, bonded or otherwise secured to the wires, as desired. Along the marginal edges of the tape, the marking wires are numbered, those along the left edge from 1 to 25 and those along the right edge 25 plus the number which corresponds on the left edge. As will be apparent, the indicia numbers are used with respect to the cables being spliced. Thus, the serviceman knowns that the wires 1 through 25 are for a first cable and wires 26 through 50 are for corresponding wires of a second cable being spliced to the first cable.

As best shown in FIG. 8, color-coding indicia of specific wires are positioned down the center of the tape. The colors on the left are the colors of the individual wires; five in number, namely, blue (BL), orange (O), green (G), brown (BR) and slate (S). The colors on the right are for the markings 68 and do not include any of the first five. They are white (W), red (R), black (BK), yellow (Y) and violet (V). Thus, for example, the color-code for marking wire 1 is BL-W for blue-white and for wire 15 is S-BK for slate-black.

In FIGS. 4 through 7, the wire selection, marking and splicing are illustrated. Cables 76 and 78, having individual wires of the same color-coding as the aid 60 shown in FIG. 1, are The wires are individually color coded at 66' and the families of wires color coded at 68', as shown in FIG. 4 illustrated in the process of being spliced. In FIG. 5, the insulation has been stripped, baring the cable ends 80 and 82 and marking wires 1 and 26 have been tied or twisted onto corresondingly marked wires of the cables. In FIG. 6, all of the marking wires have been connected to the corresponding cable wires, only marking wires 1, 2, 3, 26, 27 and 28 being shown for simplicity. When all or any desired lesser number of the cable wires have been marked and paired by their interconnection by the wires 64, the splicing is commenced. Adjacent ends of the cable wires having the same color-coding as the wires 64 which interconnect them are brought together and secured as by means of conventional clip connectors 84, soldering or as otherwise desired. The clip connectors are preferred because they conveniently slide into connecting position on the peeled wires, are easily crimped for permanent installation, and insulate the connection formed. In FIG. 7, the splicing operation has been shown as completed.

The device is preferabaly provided in rolls longitudinally of the tapes and perforated every twenty-five wires so that the tape can be torn into units corresponding to the bundles of twenty-five wires each found in normal cables.

OPERATION

The operation of the aid of the present invention is believed to be readily apparent and is briefly summarized at this point. In operation, a serviceman first strips the insulation from the end portions of all of the wires of the cables to be spliced. He then selects one of the bundles of twenty-five wires in each of the cables. When he has located the blue-white wire in the bundle of the first cable, he ties the blue-white marking wire about it in spaced relation to its stripped end portion. He then selects the blue-white wire from the bundle of the second cable and ties the blue-white marking wire around it in spaced relation to its stripped end portion. The procedure is continued until the twenty-five wires of the first cable are tied to the corresponding twenty-five wires of the second cable. While the marking wires are still tied about their respective cable wires, the ends of the corresponding cable wires are brought together and spliced by any suitable means, such as the connectors 84. After the matching cable wires have been spliced, the marking wires are removed and are, of course, available for subsequent use as desired. They also can be left in place, if desired.

The invention and its attendant advantages will be understood from the foregoing description and it will be apparent that various changes may be made in the form, construction and arrangements of the parts of the invention without departing from the spirit and scope thereof or sacrificing its material advantages, the arrangements hereinbefore described being merely by way of example. The invention is not restricted to the specific forms shown or uses mentioned except as defined in the accompanying claims, wherein various portions have been separated for clarity of reading and not for emphasis.

Having described my invention, what I claim as new and desired to secure by Letters Patent is:

1. In combination with a pair of cables having adjacent end portions and each having a multiplicity of correspondingly color-coded wires, a marking and splicing aid comprising a multiplicity of marking wires having opposite ends individually color-coded to correspond with the color-coded wires of the cables, and a binder interconnecting portions of the marking wires intermediate their opposite ends in substantially parallel relation with the opposite ends of the marking wires oppositely extended from the binder, said opposite ends of the marking wires interconnecting corresponding color-coded wires of the cables and being releasably connected to their respective cable wires in spaced relation to the ends thereof to accommodate manipulation of the ends of the cable wires directly to connect correspondingly color-coded wires of the cables in by-pass relation to the aid.

2. In combination with a pair of cables having adjacent end portions and each having a multiplicity of correspondingly visually-coded wires, a marking and splicing aid comprising a multiplicity of marking wires having opposite ends individually visually coded to correspond with the visually-coded wires of the cables, and a binder interconnecting portions of the marking wires intermediate their opposite ends in substantially parallel relation with the opposite ends of the marking wires oppositely extended from the binder, said opposite ends of the marking wires interconnecting corresponding visually-coded wires of the cables and being releasably connected to their respective cable wires in spaced relation to the ends thereof to accommodate manipulation of the ends of the cable wires directly to connect correspondingly visually-coded wires of the cables in by-pass relation to the aid.

3. The combination of claim 2 in which the holder is a strip of tape holding said elements separately in spaced substantially parallel relation.

4. The combination of claim 2 in which the corresponding wires of the cables and their respective corresponding elements are color coded in matching relation.

5. The combination of claim 4 in which the wires and their corresponding elements are divided into families with said wires and elements of each family bearing a color distinctive of their respective family and the wires and their respective elements of each family also bearing colors which are individually distinctive of the wires and their corresponding elements within the family but which are repeated in the other families.

6. The combination of claim 5 in which the families of wires and elements are divided into corresponding groups and the elements of each group are bound into a bundle of elements by holders individual to the groups.

* * * * *

UNITED STATES PATENT AND TRADEMARK OFFICE
CERTIFICATE OF CORRECTION

PATENT NO. : 3,994,090
DATED : November 30, 1976
INVENTOR(S) : James W. Wheeler

It is certified that error appears in the above—identified patent and that said Letters Patent are hereby corrected as shown below:

Column 2, line 17, after "carry" insert a period.

Column 3, line 20, after "are" and before "The" insert ---illustrated in the process of being spliced.---.

Line 22, insert a period after "Fig. 4" and delete "illustrated in the process of".

Line 23, delete "being spliced.".

Signed and Sealed this

Fifteenth Day of February 1977

[SEAL]

Attest:

RUTH C. MASON
*Attesting Officer*

C. MARSHALL DANN
*Commissioner of Patents and Trademarks*